Dec. 21, 1965    K. J. LAMERIS ETAL    3,224,043
INJECTION MOULDING MACHINES
Filed March 15, 1963
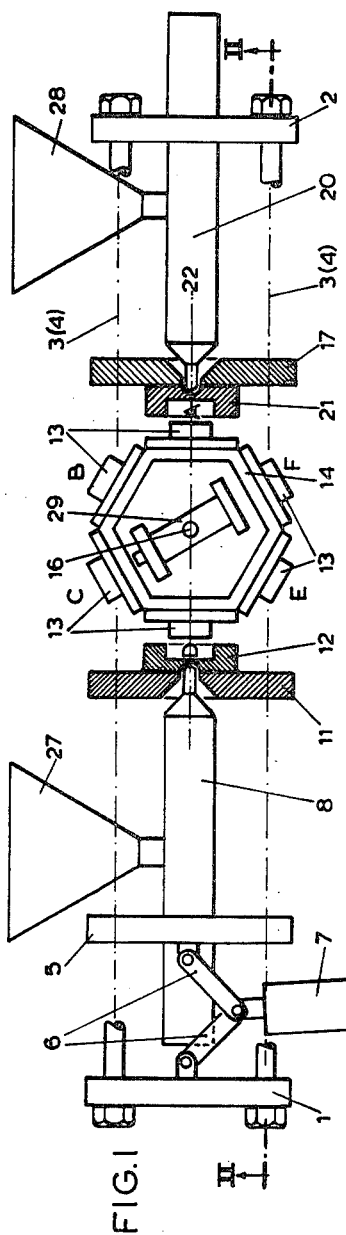
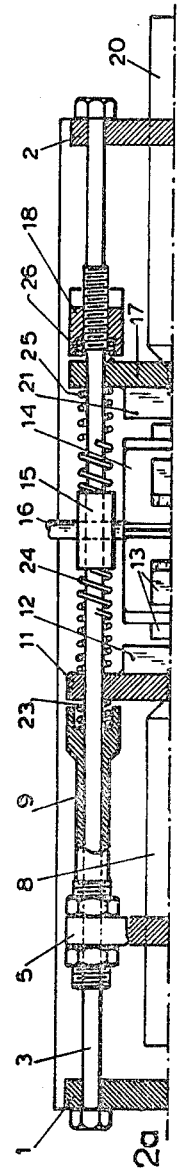
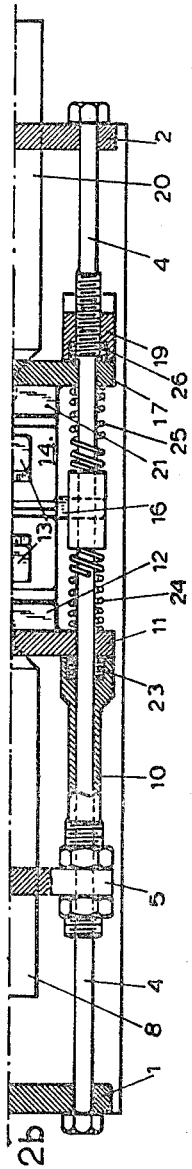
INVENTORS
KOENRAAD J. LAMERIS
JOHAN M. KLUUN
HENRICUS H. SIEBEN
BY
ATTORNEYS 3,224,043
INJECTION MOULDING MACHINES
Koenraad J. Lameris, Groningen, Johan M. Kluun, Haren, Groningen, and Henricus H. Sieben, Groningen, Netherlands, assignors to N. V. Lego Nederland, Groningen, Netherlands, a Dutch company
Filed Mar. 15, 1963, Ser. No. 265,502
Claims priority, application Netherlands, Mar. 16, 1962, 276,020
3 Claims. (Cl. 18—30)

The invention relates to an injection moulding machine comprising at least two composite moulds, each of which is composed of at least two mould parts, viz. a nozzle mould part and a counter mould part, said mould parts being mounted for relative movement and adapted to be pressed against each other during the moulding process.

An injection moulding machine of this kind is known per se. This known machine needs for each mould an individual device for closing the mould and keeping it closed after the synthetic resin has been injected into the mould cavity. These individual closing devices make this known machine comparatively complicated and expensive.

The invention has for its object to provide an injection moulding machine which has a much simpler construction. It consists in the provision of at least two nozzle mould parts mounted at some distance from one and other and facing each other, a movable support carrying at least one pair of counter mould parts and adapted to move each counter mould part into a position opposite a nozzle mould part and a closing device operating on one of said mould parts directly and adapted to close both aligned composite moulds through said movable support. Due to the fact that only one closing device of a size as required for one mould has to be provided for two moulds the machine becomes less expensive.

A simple construction is obtained if the two nozzle mould parts facing each other and the support are mounted for sliding movement on a guiding device, such as two guiding bars, extending in the direction, in which the composite moulds are closed.

It is advantageous to provide means, for instance springs, for returning the mould parts and the support into their starting positions after the injection process has been completed.

An injection moulding machine, which is particularly adapted for the injection moulding of products from two different kinds of substances and has a high production capacity, is obtained, if the movable support is provided with a plurality of pairs, e.g. three pairs of diametrically opposed counter mould parts and the support is mounted for rotation about a central axis, in such a manner, that the different pairs of counter mould parts can be successively positioned in alignment with the nozzle mould parts.

It is preferred to provide the movable support with a device for ejecting the moulded products.

The invention will be further elucidated with the aid of the accompanying drawing illustrating by way of example an embodiment of the invention. In the drawing:

FIG. 1 shows very diagrammatically a front view of the most important parts of an injection moulding machine according to the invention.

FIGURES 2a and 2b are cross sectional views taken on the line II—II in FIG. 1 showing the machine both with open and closed moulds.

The injection moulding machine illustrated in the drawing comprises two fixed end plates 1 and 2, joined by bars 3 and 4. The bars 3 and 4 are guiding pull-bars. Mounted on the bars 3 and 4 is a plate 5 adapted to be moved on the bars by the toggle-lever mechanism 6 driven by the hydraulic motor 7. The plate 5 carries an injection cylinder 8 and two adjustable distance pieces 9 and 10. An injection plate 11 is also mounted for sliding on the bars 3 and 4 and lies in front of the distance pieces. Connected to said plate 11 is the nozzle part 12 of the mould. The nozzle part 12 of the mould is in communication with the injection cylinder 8. In the situation shown in FIG. 1 (open moulds) the other part of the mould or counter mould part 13 faces the nozzle mould part 12 and is mounted on an hexagonal support 14, which is mounted for sliding movement on the guide bars 3, 4 by blocks 15. The support is also adapted to rotate about the central shaft 16 and is provided on each side with a counter mould part. On its right-hand side the machine is provided with a second nozzle plate 17, which is mounted for sliding movement on the guide bars 3 and 4 up to the adjustable stops 18 and 19. The nozzle plate 17 is in communication with a second injection cylinder 20 for the injection of material in the cavity of the nozzle mould part 21 mounted on the nozzle plate 17. Said nozzle mould part 21 faces in the situation shown in FIG. 1 an additional counter mould part 13 provided on the support 14.

According to the invention the injection cylinder 8, the nozzle mould part 12 and its counter mould part 13, the shaft 16 of the support 14, the nozzle mould part 21 and its counter mould part 13 and the injection cylinder 20 are mounted in alignment along the line 22 of the machine. Owing there to both nozzle mould parts 12 and 21 are pressed with the required pressure against their counter mould parts 13, when the closing device consisting of the hydraulic motor 7 and the toggle-lever mechanism 6 is operated. During the closing process the support 14 is moved to the right. (See FIG. 1.) The pressure exerted on and the displacement of the various parts depend on the action of the springs 23, 24, 25 and 26 for returning said parts to their starting positions after the completion of the injection processes and after the distance pieces 9 and 10 mounted on the plate 5 have been also returned. The hoppers 27 and 28 feed the substances for the products to the injection cylinders 8 and 20, respectively. In the illustrated embodiment six counter mould parts 13 are arranged on the rotary support in the positions A, B, C, D, E and F.

The injection moulding machine according to the invention is particularly suited for the injection moulding during one and the same process of products from synthetic substances having two different colours. In that case say a white substance is injected in the closed composite mould 13, 21 through the orifice of the nozzle mould part 21. After said composite mould has been opened the white product is brought into position B by turning of the support 14. Thereafter a new injection of white substance in the following counter mould part arriving in position A occurs. After the reopening of the machine the first moulded product arrives in position C and thereupon in position D, in which latter position say red substance is injected into the different formed nozzle mould part 12 after the machine has been closed again. The finished two-coloured product arrives now via position E in position F, where it may be ejected with the aid of the pneumatic cylinder 29, so that in the next position A an empty counter mould part 13 will face nozzle mould part 12.

The counter mould parts 13 need not have equally formed cavities and these parts could consist of two groups of three equal counter mould parts. In that case the counter mould parts of one group are arranged in the positions A, C, E and those of the other group in the positions B, D, F. The support 14 then has to be turned through 120° each time.

The machine according to the invention has a high production capacity. It is observed that the invention is not restricted to the described embodiment and that within the scope of the invention many variants are possible.

What we claim is:

1. An injection molding machine comprising at least two composite molds each of which is composed of a nozzle mold part and a counter mold part, said mold parts being mounted for relative movement and adapted to be pressed against each other during the molding process, said nozzle mold parts being spaced apart and in alignment with each other, a support carrying at least two pairs of said counter mold parts and being rotatable to move each pair of counter mold parts into a position opposite said nozzle mold parts, a closing device for moving one of said mold parts and operable to close both aligned composite molds by pressure against a pair of counter mold parts on said support.

2. An injection molding machine according to claim 1, wherein said nozzle mold parts face each other and together with said support are mounted for linear sliding movement on a guiding device, including a guide bar, extending in the direction in which the composite molds are closed.

3. An injection molding machine comprising a frame, at least two injection cylinders, at least two nozzle mold parts for communication with said cylinders spaced from one another and in alignment, a rotatable support, at least four counter mold parts carried by the support in pairs with the parts of each pair aligned with each other, said support being rotatable relatively to the frame into two positions, the first and the second pair of counter mold parts facing the nozzle mold parts in the first and second position of the support respectively, said cylinders, nozzle mold parts and counter mold being spaced apart during rotation of the support, a closing device for moving the aligned cylinders and mold parts together under pressure to form a pair of injection units during injection of a plastic material, one of said injection cylinders being fixed to said frame, and the second injection cylinder, the nozzle mold parts and the support being slideably mounted relative to the frame, said closing device being operable to complete and close a pair of injection units in both said positions of the support, said closing device placing a closing force in the one direction on the frame and thus on said one injection cylinder and in the opposite direction on the second injection cylinder for sliding movements of the spaced apart second injection cylinder, first nozzle mold part, the support carrying the counter mold parts, and the second nozzle mold part relative to the frame until they contact each other in the mentioned sequence and arrest against the first injection cylinder.

References Cited by the Examiner

UNITED STATES PATENTS

| 2,964,791 | 12/1960 | McFarland | 18—30 X |
| 3,005,235 | 10/1961 | Patera | 18—30 |
| 3,016,669 | 1/1962 | Grosclaude | 18—5 |

OTHER REFERENCES

German application: 1,066,731, printed Oct. 8, 1959, 18/30.

J. SPENCER OVERHOLSER, *Primary Examiner.*

MICHAEL V. BRINDISI, *Examiner.*